United States Patent [19]
Watanabe et al.

[11] 4,172,657
[45] Oct. 30, 1979

[54] VARIABLE MAGNIFICATION DEVICE
[75] Inventors: Hiroyuki Watanabe; Naohiko Kitano, both of Toyokawa, Japan
[73] Assignee: Minolta Camera Kabushiki Kaisha, Osaka, Japan
[21] Appl. No.: 863,161
[22] Filed: Dec. 22, 1977
[30] Foreign Application Priority Data
Dec. 29, 1976 [JP] Japan ................. 51/158109
[51] Int. Cl.² ............ G03B 23/08; G03B 13/28; G03B 27/52
[52] U.S. Cl. ............... 355/55; 353/27 R; 355/45
[58] Field of Search ............. 355/45, 55, 57; 354/197; 352/142; 353/26, 27

[56] References Cited
U.S. PATENT DOCUMENTS

| | | | |
|---|---|---|---|
| 1,906,059 | 4/1933 | Hadaway | 354/197 |
| 2,741,170 | 4/1956 | Wenke | 354/197 |
| 2,905,069 | 9/1959 | Ayres et al. | 354/197 |
| 3,556,655 | 1/1971 | Lux et al. | 355/55 |
| 3,653,757 | 4/1972 | Newcomb | 355/13 |
| 3,713,737 | 1/1973 | Suzuki et al. | 355/45 |
| 3,999,847 | 12/1976 | Maeda et al. | 353/27 R |

FOREIGN PATENT DOCUMENTS
51-52252  4/1976  Japan ................. 355/55

*Primary Examiner*—Donald A. Griffin
*Attorney, Agent, or Firm*—Wenderoth, Lind & Ponack

[57] ABSTRACT

A variable magnification device capable of varying magnification of projected images of information bearing media which includes a plurality of interchangeable projection lenses having different focal lengths, a change-over plate for selectively bringing the projection lenses into a predetermined projecting position, and a focusing adjusting ring normally kept out of contact with said projection lenses and capable of engaging for focusing adjustment only the selected one of the projection lenses which has been brought to the predetermined projecting position, and thus once adjusted for focusing, the selected one of the projection lenses is not required to be re-adjusted for focusing even when returned to the predetermined projecting position after having been moved through other positions for further changing over.

18 Claims, 18 Drawing Figures

VARIABLE MAGNIFICATION DEVICE

BACKGROUND OF THE INVENTION

The present invention relates to a variable magnification arrangement and more particularly, to a variable magnification device provided with a plurality of interchangeable projection lenses of different focal lengths for use, for example, in printing and reading apparatuses and the like employing microfiche films.

Commonly, microfiche films which are one type of microfilms widely employed for recording documents, office papers, etc., have various contraction rates mainly of 1/24, 1/48 and 1/42. Therefore, if a reading and printing apparatus for reading or copying such microfiche films is provided with only one projection lens having a predetermined focal length, the enlarged image to be projected is inevitably limited in size.

Accordingly, in the conventional reading and printing apparatuses, the arrangement has been such as to interchange in each case projection lenses having focal lengths (projection magnification) corresponding to the contraction rates of the microfiche films. The known arrangement as described above, however, has such disadvantages that not only storage is required for such interchangeable projection lenses, but interchanging thereof is troublesome requiring time, while focusing adjustment is necessary each time there is an interchange. Meanwhile, there has also been conventionally proposed an arrangement in which the projection lenses as described above are incorporated in the reading and printing apparatus for selectively bringing the projection lenses the desired focal length into the projecting position, which arrangement, however, is also disadvantageous in that because of the considerable space required, the apparatus tends to be large in size, while focusing adjustment of the projection lens is extremely difficult, since such lenses are disposed in the inner portion of the apparatus.

In order to overcome the disadvantages as described above, there has further been proposed another known variable magnification device, for example, in U.S. Pat. No. 3,713,737 or in Japanese Utility Model Laid-Open publication No. 51/52252 wherein a plurality of projection lenses having different focal lengths are adapted to move as one unit for bringing a particular projection lens suitable for the purpose over the projecting position for focusing adjustment thereof by one focusing adjusting means provided at said projecting position. The known arrangement as described above still has such drawbacks that during change-over of the desired projection lens to the projecting position, displacement of the focal point inevitably takes place due to rotation of the projection lens through rotational resistance between a toothed portion of the focusing adjusting means and that of the projection lens, thus requiring the focusing adjustment at each change-over of the projection lenses. Furthermore, in the arrangement as described above, if the focusing adjusting means is inadvertently touched by an operator, deviation or displacement of the focal point may occur, also requiring readjustment.

Another disadvantage inherent in the known arrangements is that since focal lengths, f number and projection magnification differ according to the projection lenses employed, intensity of illumination of the projected images tend to be different, for example, in a reading and printing apparatus at an observation screen for reading and at an exposure station for printing when such projection lenses are merely changed over to the projecting position, and thus an exposure adjustment is required each time the projection lenses are interchanged for obtaining copied images of optimum density at all times.

Accordingly, an essential object of the present invention is to provide a variable magnification device for use in various apparatuses and equipment employing a plurality of interchangeable lenses, for example, in a reading and printing apparatus in which focusing adjustment is readily effected without necessity for re-adjustment at the time of each projection lens change-over, with substantial elimination of the disadvantages inherent in the conventional variable magnification devices of this kind.

Another important object of the present invention is to provide a variable magnification device of the above described type which is equipped with focusing adjusting means adapted to be moved to engage the projection lens during the focusing adjusting for adjusting the focusing only of the projection lens which has been changed over to the projecting position, while the focusing adjusting means is arranged to be normally isolated from the projection lens so that the projection lens once adjusted for focusing is not moved from the focused position despite further change-over, so that the necessity of readjustment at such change-over is eliminated.

A further object of the present invention is to provide a variable magnification device of the above described type in which exposure adjustment through control of intensity of illumination of projected images is simultaneously effected with the focusing adjustment in association with the changeover of a change-over plate for the projection lenses.

A still further object of the present invention is to provide a variable magnification device of the above described type which has a simple construction and is stable in functioning without the possibility of malfunction, and can be incorporated at low cost into various apparatuses and equipment employing a plurality of interchangeable lenses for changing-over.

SUMMARY OF THE INVENTION

In accomplishing these and other objects according to the present invention, there is provided a variable magnification device capable of varying magnification of projected images of information bearing media which includes a plurality of interchangeable projection lenses having different focal lengths, a change-over plate for selectively bringing said projection lenses into a predetermined projecting position, and a focusing adjusting ring normally kept out of contact with said projection lenses and capable of engaging for focusing adjustment only the selected one of said projection lenses which has been brought to said predetermined projecting position, and thus once adjusted for focusing, said selected one of said projection lenses is not required to be re-adjusted for focusing even when returned to said predetermined projecting position after having been moved through other positions for further changing over. Furthermore, the movement of the change-over plate is arranged to actuate switch means to control the intensity of illumination of projected images for effecting exposure adjustment simultaneously with the focusing adjustment, thus making it possible to obtain copied images of optimum density irrespective of the change-over of the projection lenses.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
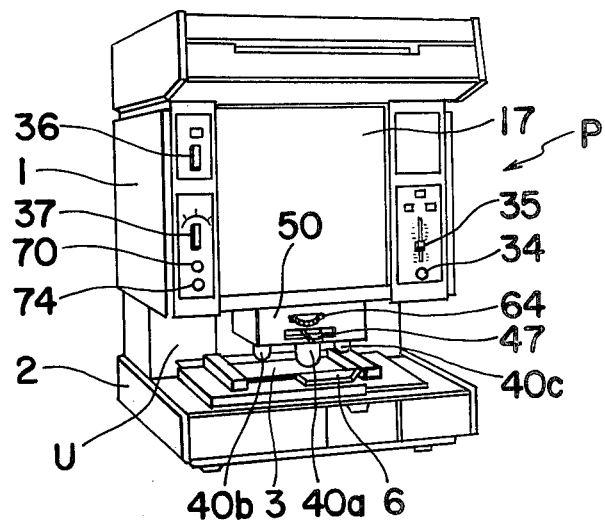
FIG. 1 is a perspective view of a reading and printing apparatus in which a variable magnification device of the present invention may be incorporated.
Figure 2:
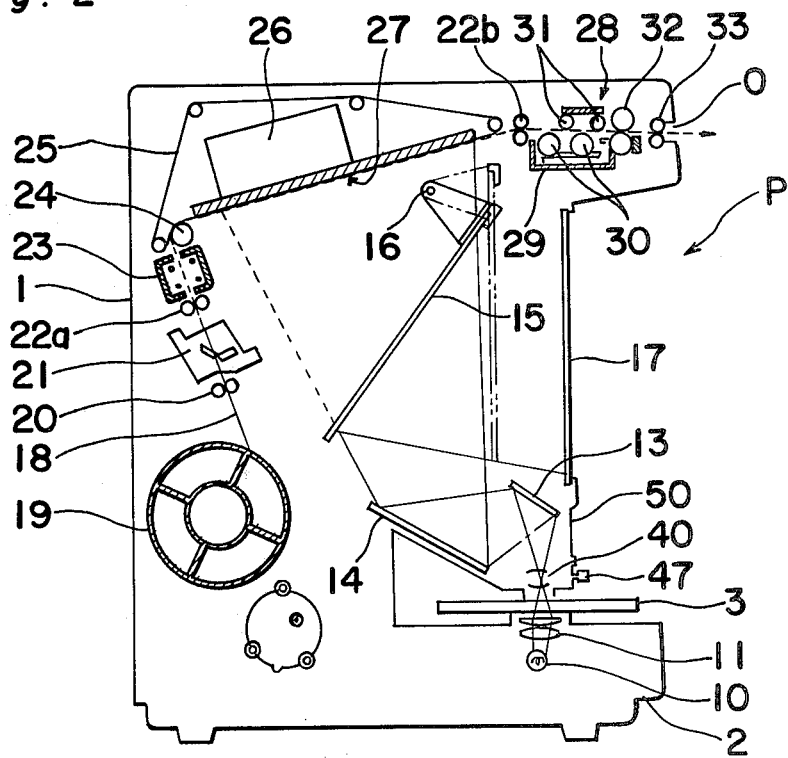
FIG. 2 is a schematic side sectional view showing, on an enlarged scale, the arrangement of component parts in the apparatus of FIG. 1.
Figure 3:
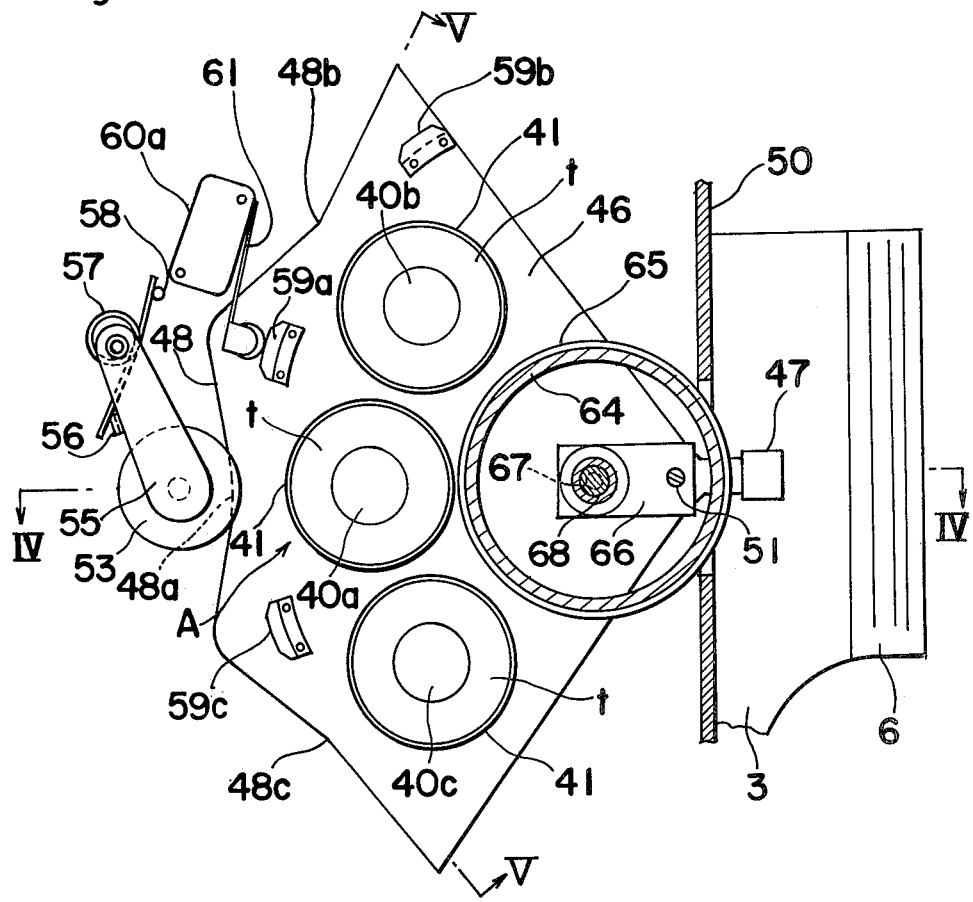
FIG. 3 is a top plan view, showing the construction of a variable magnification device according to one preferred embodiment of the present invention which may be incorporated in the reading and copying apparatus of FIG. 1.
Figure 4:
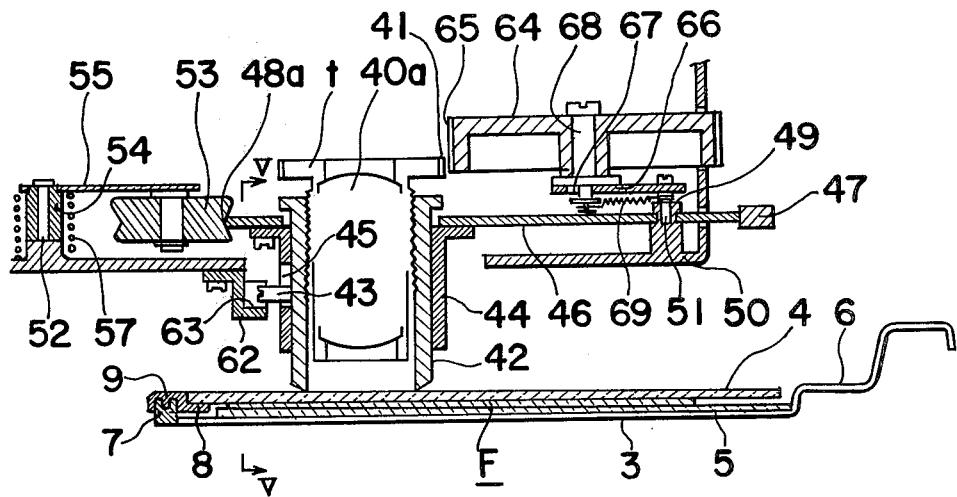
FIG. 4 is a sectional view taken along the line IV—IV in FIG. 3.
Figure 5:
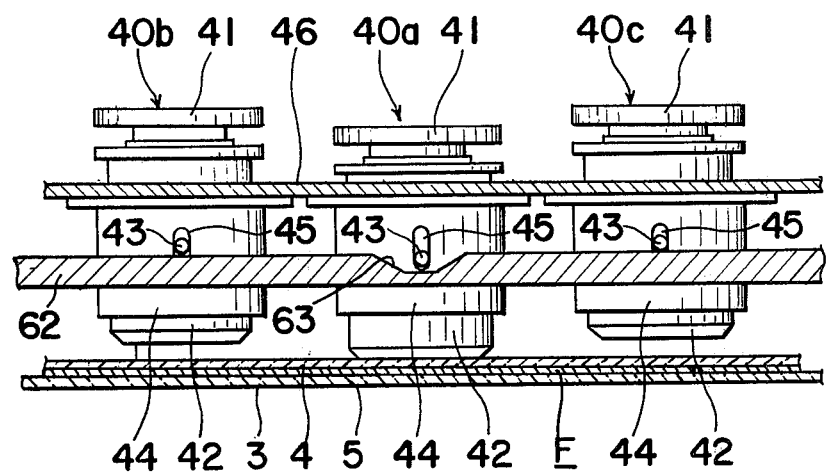
FIG. 5 is a sectional view taken along the line V—V in FIG. 3.
Figure 6A:
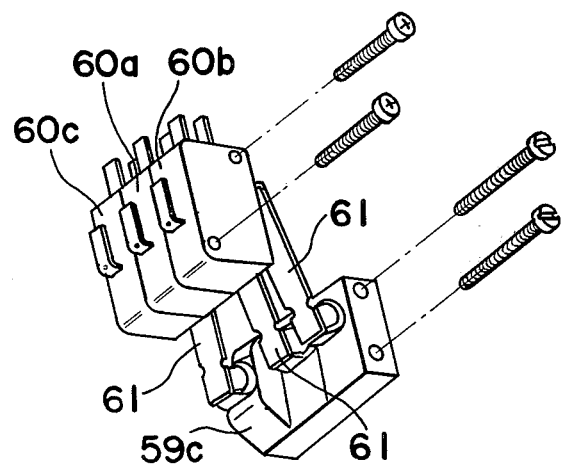
FIG. 6(a) is a perspective view showing, on an enlarged scale, the construction of microswitches employed in the arrangement of FIG. 3, FIGS. 6(b) and 6(c) are perspective views showing on enlarged scales, the construction of cams for actuating the microswitches of FIG. 6(a)
Figure 6B:
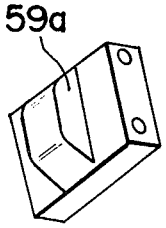
Figure 6C:
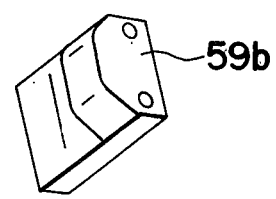

Referring now to the drawings, there is shown in FIGS. 1 and 2 a reading and printing apparatus P in which a variable magnification device according to the present invention may be incorporated. The reading and printing apparatus P generally includes a base portion 2 and a main body 1 extending upwardly from the base portion 2 and having at its front wall an observation screen or display surface 17. On the base portion 2, there is disposed a carrier 3 mainly of light transmitting material, for example, of glass which is movable backward and forward, and leftward and rightward and on which information bearing media such as microfiche films (not shown) are held flat so as to be illuminated through a condenser lens assembly 11 by a light source 10 disposed within the base portion 2 immediately below and adjacent to the carrier 3 so that light images of information or data contained in the microfiche film are projected onto the observation screen 17 by a projecting lens assembly 40 through reflection mirrors 13, 14 and 15 suitably inclined to direct the image light toward said observing screen 17. More specifically, as is seen from FIG. 4 the carrier 3 referred to above includes an upper light transmitting plate 4 which is provided with a holding member 8 fixed to one edge thereof and having pins 9 at its opposite ends for pivotal connection with a supporting member 7 secured to a forward edge of an operating member 6, and a lower light transmitting plate 5 also fixed to the operating member 6 for holding the microfiche F between the plates 4 and 5. The reflecting mirror 15 is arranged to be rotated, during copying operation about a shaft 16 secured to a frame (not shown) of the apparatus P, to a position shown by a chain line in FIG. 2. At the left lower portion of the apparatus P in FIG. 2, there is rotatably provided a spool 19 on which photosensitive paper 18 is stored in a roll form, while along a path of the copy paper sheet 18 shown in a dotted line, a pair of transportation rollers 20, a cutter 21, another pair of transportation rollers 22a, a corona charger 23, a pressing roller 24, and a suction belt 25 movably supported by a plurality of rollers and, associated with a suction unit 26 are sequentially disposed. The photosensitive paper 18 is subjected to exposure to image light, as it is fed through the above described passage, at an exposure station 27 a portion of the suction belt 25 is kept flat through attraction by the suction unit 26. Along the passage from the exposure station 27 to a discharge outlet O for the photosensitive paper 18, there are sequentially disposed a pair of transportation rollers 22b, a developing device 28, a pair of squeezing rollers 32 and another pair of absorbing rollers 33. The developing device 28 includes a developing tank 29 containing developing solution therein, a pair of spaced developing electrode lower rollers 30 partially immersed in the developing solution, and another pair of spaced developing electrode upper rollers 31 rotatably disposed above the lower rollers 30.

On the front wall of the main body 1 at edge portions adjacent to the observation screen 17, there are disposed a power switch 70, a printing switch 34, exposure control knob 35, a setting dial 36 for the number of copies, a change-over switch 37 for copying sizes, etc.

Referring now to FIGS. 3 to 6(c), there is shown one embodiment of the variable magnification device according to the present invention, in which projection lenses 40a, 40b and 40c each having a different focal length are spaced at predetermined intervals on a change-over plate 46 along the circumference of a circle about a supporting shaft 51 for the plate 46. Each of the projection lenses 40a, 40b and 40c is mounted in a lens mount t which is threadedly engaged with a barrel 42 for vertical movement, and has a toothed portion 41 at the upper periphery of the lens mount t, while the barrel 42 is received in a barrel holder 44 secured to the change-over plate 46. The change-over plate 46 is provided as supporting means for selectively bringing the projection lenses 40a, 40b and 40c into a projecting position A, and is housed in a casing 50 provided in a recessed portion U formed between the carrier 3 on the base portion 2 and a wall immediately below the observation screen 17. It is movably supported at its one side through a journal 49 thereof on a shaft 51 secured to the casing 50, while the other side edge 48 of the change-over plate 46 is held in contact with a roller 53 under pressure for permitting the plate 46 to rotate about the shaft 51 in a horizontal plane. The roller 53 is rotatably mounted at a distal portion of a click lever 5 pivotally connected at its other end to a shaft 52 secured to the inner portion of the casing 50 through a bearing 54. A coil spring 57 wound around the bearing 54 has its one end engaged with a fixed pin 58 and its other end in contact with a bent projection 56 of the click lever 55, so that the click lever 55 is urged counterclockwise in FIG. 3, with the roller 53 normally contacting under pressure the other side edge 48 of the changeover plate 46. On said other side edge 48 of the change-over plate 46, recesses 48a, 48b and 48c are formed on straight lines respectively connecting the shaft 51 for the rotational center of the plate 46 and the centers of the projection lenses 40a, 40b and 40c, and thus the projection lenses 40a, 40b and 40c are selectively brought to and positioned at the projecting position A by moving, toward the left or right, a knob 47 of the change-over plate 46 extending out from the casing 50 into the front portion of the apparatus P for engagement under pressure of the roller 53 with the recesses 48a, 48b and 48c. Further fixed on the change-over plate 46 adjacent to the other side edge 48 thereof at predetermined intervals are cams 59a, 59b and 59c of different heights which are adapted to operate corresponding actuators 61 of microswitches 60a, 60b and 60c disposed one about the other as shown in FIG. 6(a). In other words, the microswitches 60a, 60b and 60c are arranged to be respectively actuated by the cams 59a, 59b and 59c for generating detection signals described later when the projection lenses 40a, 40b and 40c are at the projecting position A.

At the lower surface of the casing 50, there is fixed a push-up cam 62 having a recess 63 therein, while a guide pin 43 laterally extending from each of the side walls of the barrels 42 of the projection lenses 40a to 40c contacts the upper surface of the push-up cam 62 through a guide opening 45 formed in the barrel holder 44 described earlier. When the interchangeable projection lenses 40a, 40b and 40c are changed over to bring the selected one of them into the projecting position A, the guide pin 43 is dropped into the recess 63 of the push-up cam 62 to allow the lower end of the barrel 42 to contact the upper light transmitting plate 4 of the carrier 3, while upon changing over of such selected projection lens to positions other than the projecting position A, the guide pin 43 rides over the upper surface of the cam 62 for spacing the lower end of the barrel 42 from said upper light transmitting plate 4, so that damage to the upper light transmitting plate 4 during interchanging of the projection lenses 40a to 40c is prevented. The guide pin 43 also serves as a stopping member to stop rotation of the barrel 42 with respect to the barrel holder 44.

On the other hand, as focusing adjusting means, there is provided adjacent to the projection lenses 40a to 40c, a focusing adjusting ring 64 having a toothed portion 65 at the peripheral edge thereof and rotatably mounted through a shaft 68 on a support plate 66 secured to the upper portion of the shaft 51 for the change-over plate 46, with part of the ring 64 extending outwardly into the front surface of the casing 50 for manual rotation of said ring 64. The shaft 68 extends through an elongated opening 67 longitudinally formed in the support plate 66 for axial movement within the elongated opening 67 and is also connected to the shaft 51 through a return spring 69. Accordingly, the focusing adjusting ring 64 is normally urged toward the front surface of the casing 50 by the spring 69, in which case, the toothed portion 65 of the ring 64 is not engaged with the toothed portion 41 of any of the projection lenses 40a to 40c. The focusing adjusting ring 64, only when depressed inwardly toward the projection lenses, engages, by its toothed portion 65, the toothed portion 41 of the selected one of the projection lenses 40a to 40c changed over to the projecting position A for permitting the focusing adjustment to be made. More specifically, only when the selected one of the projection lenses 40a to 40c has been brought to the projecting position A and the focusing adjusting ring 64 has been depressed inwardly, does the toothed portion 41 of the particular projection lens mesh with the toothed portion 65 of the focusing adjusting ring 64.

Figure 7:
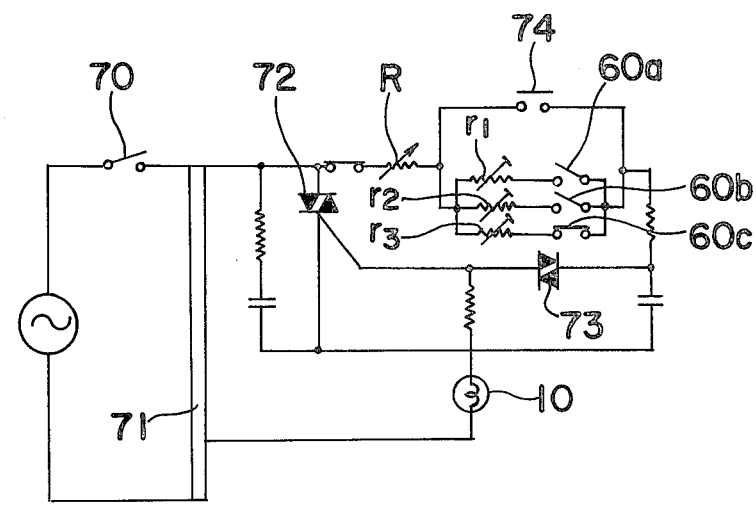
FIG. 7 is an electrical circuit diagram showing a control circuit coupled with the variable magnification device of the present invention.

Referring to FIG. 7 showing an electrical circuit diagram of a control circuit for the reading and printing apparatus P related to the present invention having construction as described above, the power switch 70 provided on the front wall of the main body 1 adjacent to the observation screen 17 (FIG. 1) is connected to a light source 10 through a transformer 71 for supplying power to the light source 10, with a triac 72 and a diac 73 being further inserted to control the angle of conduction of such supplied power, while a variable resistor R connected exposure control knob 35 for setting the power to be supplied to the light source 10 has its one end coupled to corresponding ends of semifixed resistors r1, r2 and r3 connected in parallel to each other, while the other ends of the resistors r1 to r3 are connected to the microswitches 60a, 60b and 60c described earlier. The semi-fixed resistors r1 to r3 are arranged to control the power to be supplied to the light source 10, when the projection lenses 40a to 40c are selectively brought into the projecting position A through operation of the operation knob 47 (FIGS. 3 and 4), and are set to such values as will provide the same intensity of illumination at the observation screen 17 and exposure station 27. Another switch 74 provided on the main body 1 of the apparatus P immediately below the power switch 70 (FIG. 1) has its one end connected to the microswitches 60a to 60c, while the other end of the switch 74 is connected to the corresponding ends of the resistors R and r1 to r3.

The operation of the reading and printing apparatus as described above will be described hereinbelow.

When the selected one of the projection lens, for example, projection lens 40a having a predetermined focal length in the group of the interchangeable projection lenses 40a, 40b and 40c is brought to the projecting position A by laterally moving the operating knob 47 as described earlier, with subsequent rotation of the focusing adjusting ring 64 depressed inwardly, the projection lens 40a in the lens mount t is vertically moved while rotating with respect to the barrel 42, since the toothed portion 41 of the lens mount t is in mesh with the toothed portion 65 of the focusing adjusting ring 64, and thus focusing is adjusted for a microfiche film F held between the upper and lower light transmitting plates 4 and 5 of the carrier 3. If the power switch 70 has preliminarily been turned ON, the power set by the resistors R and r1, triac 72 and diac 73 is supplied to the light source 10 through turning ON of the microswitch 60a by the cam 59a on the change-over plate 46, with consequent projection of the images of the data contained in the microfiche film F.

For copying such projected images, the dial 36 (FIG. 1) is first set to the desired number of copies, while the required size of the copy paper is set by the photosensitive paper size changer-over switch 37. Subsequently, upon turning ON of the printing switch 34, the light source 10 is de-energized, with simultaneous movement of the mirror 15 by driving means (not shown) to the position shown by the dotted line in FIG. 2. Meanwhile, the photosensitive paper 18 drawn out from the spool 19 by the rotation of the feeding rollers 20 is subjected to corona charging by the corona charger 23 and simultaneously cut to the required size by the cutter 21 to be further fed to the exposure station 27 and stopped thereat by the suction of the suction belt 25. While the photosensitive paper 18 remains stationary at the exposure station 27 as described above, the light source 10 is again energized for subjecting the photosensitive paper 18 to exposure by the light images of the data from the microfiche film F, and then the photosensitive paper 18 thus exposed is further fed through the developing device 28, squeezing rollers 32 and absorbing rollers 33, and the copying is completed, with the photosensitive paper 18 bearing the copied images thereon being subsequently discharged out of the apparatus P through the discharge opening O at the upper front portion of the apparatus P.

In the next step, for further enlarging a predetermined one of the microfiche films, when the projection lens 40a in the projecting position A is to be changed over, for example, to the projection lens 40b by operating the operating knob 47, the light source 10 is not energized, and no images are projected on the observation screen 17, since each of the microswitches 60a, 60b and 60c is turned OFF during the change-over. When the projection lens 40b has been brought to the projecting position A, the microswitch 60b is turned ON by the cam 59b to energize the light source 10 for projecting the images of the data of the microfiche film onto the observation screen 17. In the above case, intensity of illumination of the images projected to the observation screen 17 or exposure station 27 by the projection lens 40a through the resistor r2 is equal to that projected at said observation screen 17 or exposure station 27 by the projection lens 40b. Accordingly, when the variable resistor R is so adjusted by the exposure adjusting knob 35 (FIG. 1) as to provide copied images of optimum density through the projection lens 40a, proper density of the copied images is also available for copies from the projection lens 40b, and thus exposure adjustment due to interchanging of the projection lenses 40a, 40b and 40c is unnecessary.

Furthermore, for projection of data of microfiche films F in a bright room, it is possible to increase the power supply to the light source 10 so as to provide clear and definite images by turning ON of the switch 74, apart from the change-over of the microswitches 60a, 60b and 60c described earlier.

It should be noted here that the semi-fixed resistors r1, r2 and r3 are provided as means for adjusting the intensity of illumination at the observation screen 17 or exposure station 27 due to different focal lengths, F numbers and projecting magnifications of the respective projection lenses 40a, 40b and 40c, and the resistance values for the resistors r1, r2 and r3 are so adjusted as to correspond to one particular projection lens of the three projection lenses 40a to 40c that gives the lowest intensity of illumination on the observation screen 17 or exposure station 27.

It should also be noted that the toothed portion 41 of the lens amount t does not engage the toothed portion 65 of the focusing adjusting ring 64 even when any of the projection lenses 40a, 40b and 40c is brought to the projecting position A (i.e., such engagement between the portions 41 and 65 being effected only when the focusing adjusting ring 64 is depressed inwardly toward the projection lenses as described earlier), so that focusing once adjusted remains unchanged, and since the projection lenses 40a to 40c are not rotated by mere turning of the focusing adjusting ring 64, for example, through inadvertent touching unless the ring 64 is pressed inwardly, they are advantageously prevented from being moved out of focus at all time.

Figure 8:
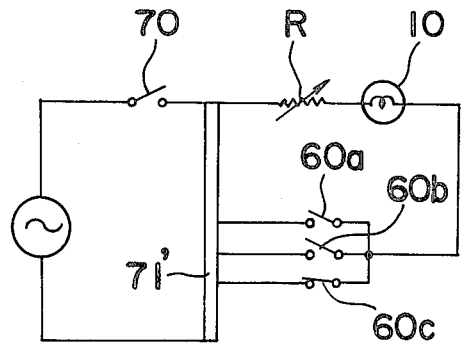
FIGS. 8 and 9 are similar views to FIG. 7, but particularly showing modifications thereof.
Figure 9:
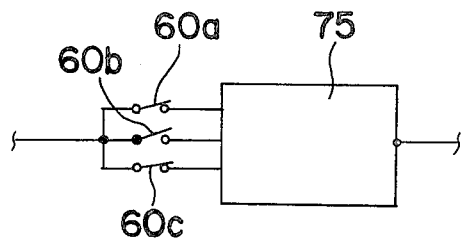

Referring to FIGS. 8 and 9, there is shown in FIG. 8 a modification of the circuit arrangement in FIG. 7. In this modification for variation of the supply voltage to the light source 10, the transformer 71' is further provided with output terminals for association with the projection lenses 40a, 40b and 40c, with said output terminals being connected to the respective microswitches 60a, 60b and 60c. The voltages at said output terminals are so adjusted a constant rate of illumination intensity is achieved through the projection lenses 40a to 40c on the observation screen 17 and exposure station 27 during the projection for reading or copying, so that re-adjustment of exposure light at time of interchanging of the projection lenses 40a to 40c is unnecessary. In a further modified circuit construction in FIG. 9 wherein the amount of exposure light is adjusted by adjusting the exposure time, there is provided a timer 75 for controlling the time for energization of the light source 10 so that the exposure at time of interchanging of the projection lenses 40a to 40c is kept constant through the microswitches 60a to 60c mentioned earlier.

Figure 10:
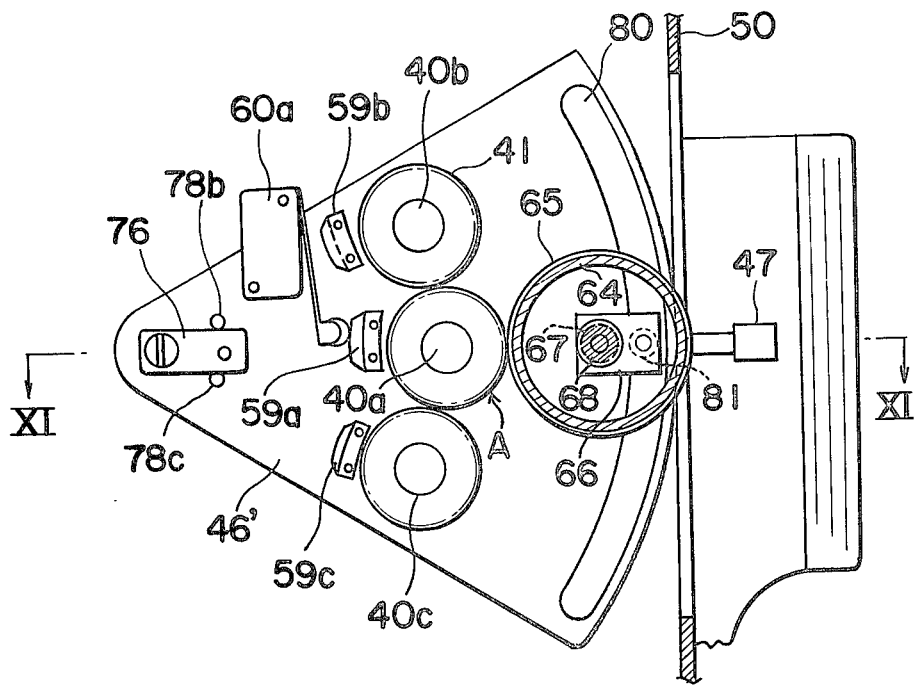
FIG. 10 is a view similar view to FIG. 3, but particularly showing a modification thereof.
Figure 11:
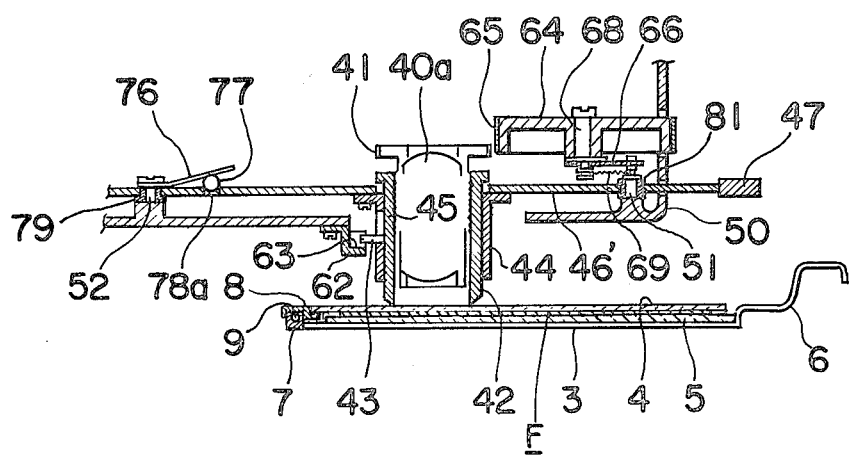
FIG. 11 is a sectional view taken along the line XI—XI in FIG. 10.

Referring now to FIGS. 10 and 11, there is shown a modification of the variable magnification device of FIGS. 3 to 9 according to the present invention. In this modification, the change-over plate 46 described as employed in the first embodiment of FIGS. 3 to 6(c) is replaced by a modified change-over plate 46' having a sector shape, while the shaft 51 for the rotational center of the plate 46 in FIGS. 3 to 6(c) is also changed to a shaft 52 provided at the side of the plate 46' remote from the operating knob 47. The positioning arrangement for the projection lenses 40a to 40c employing the roller 53, click lever 55, coil spring 57, etc., described as employed in the embodiment of FIGS. 3 to 6(c) is also replaced by a click stop arrangement in which the positioning at the interchanging of the projection lenses 40a to 40c is effected through selective elastic engagement of a click ball 77 pressed by a click spring plate 76 fixed to the shaft 52, with click recesses 78a, 78b and 78c formed in the change-over plate 46'. More specifically, the change-over plate 46' is rotatably mounted, at said side thereof remote from the operating knob 47, on the shaft 52 through a bearing 79, while at the other side of the plate 46', there is formed an arcuate guide opening 80 in which a guide roller 81 rotatably mounted on the shaft 51 is received, and upon lateral movement of the operating knob 47, the arcuate guide opening 80 is guided by the guide roller 81 to rotate the change-over plate 46' about the shaft 52 for the selective changing over of the projection lenses 40a to 40c to the projecting position A. The construction and function of the cams 59a, 59b and 59c fixed on the change-over plate 46' adjacent to the projection lenses 40a to 40c and the corresponding microswitches 60a, 60b and 60c having the actuators 61 and of the focusing adjusting ring 64 are similar to those in the embodiment of FIGS. 3 to 9, and therefore, a detailed description thereof is omitted.

Figure 12:
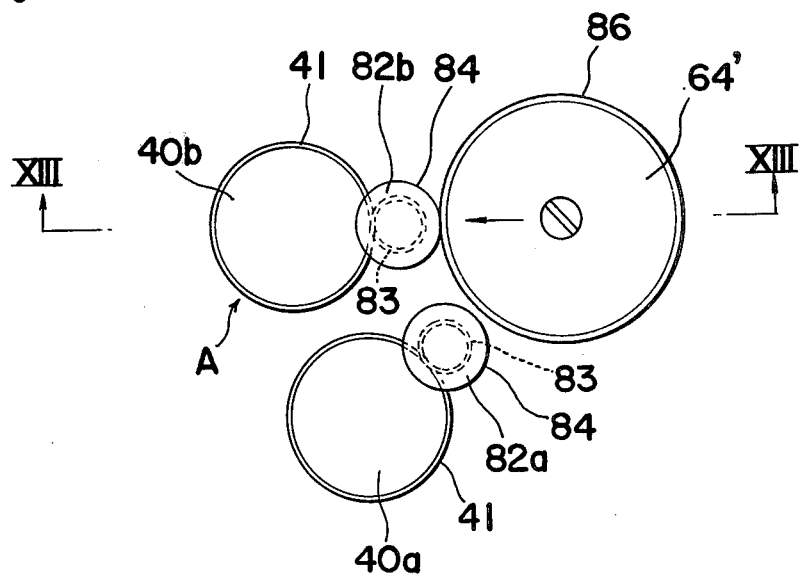
FIG. 12 is a view similar to FIG. 3, but particularly showing a main portion of a further modification thereof.
Figure 13:
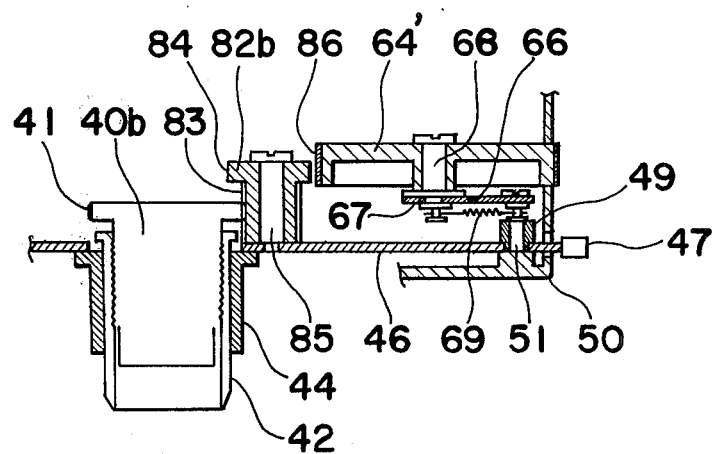
FIG. 13 is a sectional view taken along the line XIII—XIII in FIG. 12.

Referring also to FIGS. 12 and 13, there is shown a main portion of a further modification of the variable magnification device of FIGS. 3 to 9. The modified arrangement of FIGS. 12 and 13 is different from the arrangement of FIGS. 3 to 6(c) in that intermediate idler members or transmission members 82a and 82b are further disposed between the focusing adjusting ring 64' and the projection lenses 40a and 40b. The intermediate idler members 82a and 82b made of material having a large coefficient of friction are rotatably mounted on shafts 85 secured to the change-over plate 46, while toothed portions 83 of the idler members 82a and 82b are in mesh with the corresponding toothed portions 41 on the lens mounts t of the projection lenses 40a and 40b. Meanwhile, around the peripheral edge of a modified focusing adjusting ring 64', a friction ring 86 of material having a large coefficient of friction is wound for securing thereat. The friction ring 86 of the focusing adjusting ring 64' is adapted to contact under pressure the peripheral edge 84, for example, of the intermediate idler member 82b for the projection lens 40b upon depression of the focusing adjusting ring 64' inwardly, with rotation of the focusing adjusting ring 64 being transmitted to the intermediate idler member 82b through frictional force between the outer peripheries of the idler member 82b and friction ring 86 of the focusing adjusting ring 64' to rotate the projection lens 40b for focusing adjustment.

When the intermediate idler members 82a and 82b are interposed between the focusing adjusting ring 64' and projection lenses 40a, and 40b as described above, the depressing force of the focusing adjusting ring 64' during the focusing adjustment is not directly exerted on the projection lenses 40a and 40b, with only the rotational force being transmitted, and thus a drawback such as deviation in parallelism between the projection lenses 40a and 40b and the microfiche film due to such depressing force is advantageously eliminated. Furthermore, when the focusing adjusting ring 64' is associated in rotation with intermediate idler members 80a and 80b through the frictional force, contact therebetween is quite smooth and good to the feel when the focusing adjusting ring 64' is rotated for adjustment.

Needless to say the focusing adjustment through friction as described above may further be modified to be effected by gears and the like.

Additionally, in the foregoing arrangements, although the number of teeth at the toothed portion 65 of the focusing adjusting ring 64 is adapted to be larger than that at the toothed portion 41 for each on the projection lenses 40a to 40c, it is possible to finely adjust the focusing by reducing the amount of rotational displacement of the projection lenses 40a to 40c with respect to the amount of rotational displacement of the focusing adjusting ring 64 through employment of another gear and the like.

Figure 14:
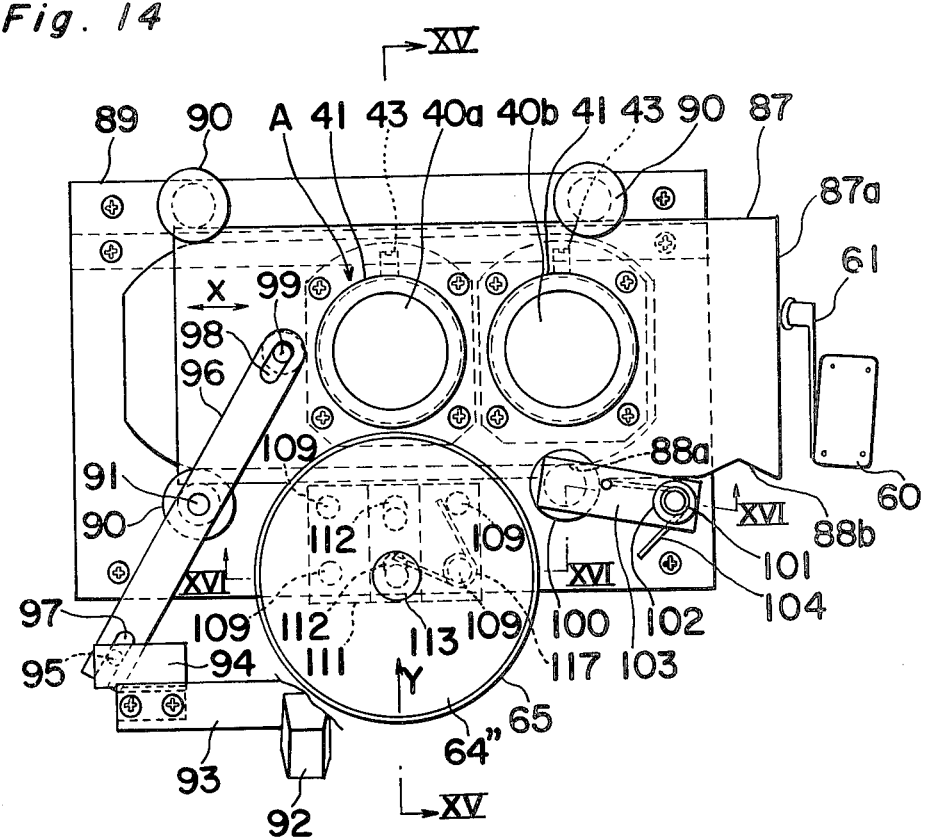
FIG. 14 is a top plan view showing the construction of a variable magnification device according to another embodiment of the present invention.
Figure 16:
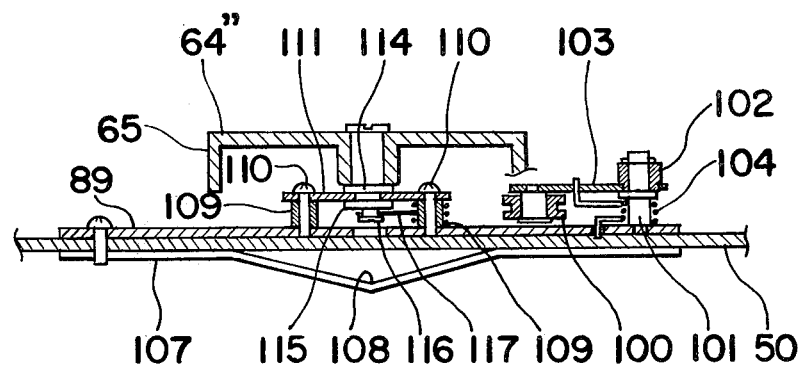

Referring now to FIGS. 14 and 16, there is shown another embodiment of the variable magnification device according to the present invention, wherein a change-over plate 87 of rectangular shape on which two projection lenses 40a and 40b are mounted and aligned side by side is arranged to be moved in a straight line in the direction of alignment of the projection lenses for selectively bringing the projection lenses 40a and 40b into the projecting position A. The change-over plate 87 is guided for movement in the directions indicated by the arrow X by three guide rollers 90 rotatably mounted adjacent to two edges of the plate 87 on the fixing plate 89 secured to the casing 50. An operating knob 92 extending outwardly from the front surface of the casing 50 is connected to a change-over lever 96 through a fixing plate 93 secured to a connecting plate 94. The change-over lever 96 is rotatably mounted at the central portion thereof to the distal portion of a shaft 91 for one of the guide rollers 90, while an elongated opening 97 formed at one end of the lever 96 is slidably engaged with a pin 96 extending from the connecting plate 94, with another elongated opening 98 formed at the other end of the lever 96 being in sliding engagement with a distal portion of a shaft 99 secured to the change-over plate 87.

Accordingly, in the arrangement as described above, the change-over plate 87 is laterally moved (in the directions of the arrow X) through pivotal movement of the change-over lever 96 about the shaft 91 following the lateral movement of the operating knob 92 for interchanging the projection lenses 40a and 40b. Positioning of the change-over plate 87 is effected by engagement of a positioning roller 100 under pressure with either the notch 88a or 88b for the projection lens 40a or 40b formed in a corresponding side edge of the plate 87. The roller 100 is rotatably mounted at the distal end of a click lever 103 pivotally mounted through a bearing 102 on a shaft 101 secured to the fixing plate 89, while a coil spring 104 wound around a shaft 101 is in engagement at one end thereof with the fixing plate 89, with the other end of the spring 104 engaging the click lever 103 for urging the click lever 103 clockwise in FIG. 14, so that the roller 100 normally contacts one edge of the change-over plate 87 under pressure. A sliding plate 105 disposed between the fixing plate 93 of the operating knob 92 and the connecting plate 94 is held between rotatable guide rollers 106 for being guided for lateral movement. On the lower surface of the casing 50, push-up cams 107 each having a recess 108 are fixed for engaging the guide pins 43 extending from the barrels 42 of the projection lenses 40a and 40b so as to vertically move the barrels during the interchanging.

Meanwhile, the focusing adjusting ring 64" having the toothed portion 65 formed at the peripheral edge thereof is rotatably mounted through a shaft 113 on a support plate 111 secured to the fixing plate 89 through studs 109 and securing screws 110. The shaft 113 is slidable forward and backward by extending the shaft portion of the slide shaft 116 threaded to the lower end of the shaft 113 to fix slide plates 114 and 115 which hold the support plate 111, into one of the elongated guide openings 112 formed in the support plate 111 in the direction shown by the arrow Y normal to the lateral direction shown by the arrow X. For normally urging the focusing adjusting ring 64" toward the front of the casing 50, a return spring 117 is disposed around one of the studs 109, with one end of the spring 117 engaging the lower end of the shaft 113 and the other end thereof contacting another one of the studs 109.

Figure 15:
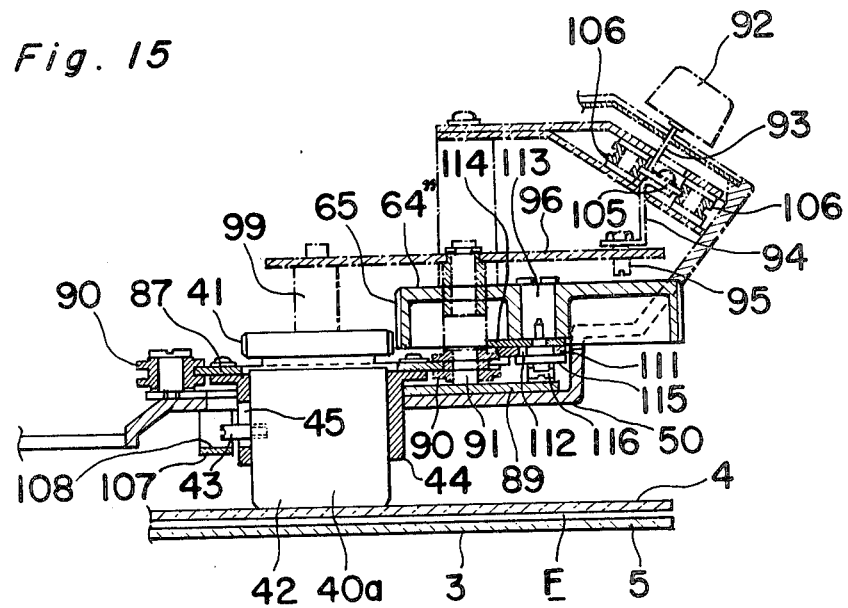
FIG. 15 is a sectional view taken along the line XV—XV in FIG. 14 and, FIG. 16 is a sectional view taken along the line XVI—XVI in FIG. 14, Before the description of the present invention proceeds, it is to be noted that like parts are designated by like reference numerals throughout several views of the accompanying drawings.

Accordingly, the toothed portion 65 of the focusing adjusting ring 64 in the embodiment of FIGS. 14 to 16 is normally out of engagement with the toothed portions 41 of the projection lenses 40a and 40b as in the focusing adjusting ring for the other embodiments described earlier, and is brought into engagement with one of the toothed portions 41 of the projection lenses 40a and 40b changed over to the projecting position A for enabling the focusing adjustment only when the ring 64" is depressed inwardly toward the corresponding projection lens.

Additionally, adjacent to one side edge 87a of the change-over plate 87, there is provided a microswitch 60 for selective engagement and disengagement, at its actuator 61 thereof, with and from the corresponding side edge 87a for changing-over of the resistors as described with reference to FIG. 7 through switching-over of the microswitch 60 so that the intensity of illumination at the observation screen 17 or exposure station 27 can be maintained constant as in the embodiment of FIGS. 3 to 9.

As is clear from the foregoing description, according to the variable magnification device of the present invention, the focusing adjusting means is moved during the focusing adjustment for adjusting only the projection lens changed over to the projecting position, while said means is arranged to be normally isolated from the projection lenses, and therefore, not only is the focusing adjustment readily effected in a small space, but contact of the projection lenses with the focusing adjusting means at each interchanging is eliminated, so that re-adjustment at every changing over of the projection lenses is unnecessary after initial adjustment is once effected. Moreover, the projection lenses are free from movement even if the focusing adjusting means is rotated inadvertently, with complete elimination of the possibility of malfunction.

It should be noted here that in the foregoing embodiments, although the present invention is mainly described with reference to the reading and printing apparatus, the concept of the present invention is not limited in its application to such reading and printing apparatus alone, but may readily be applicable to any other apparatuses and equipment equipped with a change-over plate or the like having a plurality of interchangeable lenses, for example, microscopes, movie cameras, TV cameras, etc.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A variable magnification device capable of varying magnification of projected images of information bearing media which comprises;

a plurality of interchangeable projection lenses having different focal lengths, a change-over means having said projection lenses mounted thereon for selectively bringing said projection lenses into a predetermined projecting position through pivotal rotation thereof, said change-over means being provided with means for guiding the pivotal rotation thereof and means for positioning a selected one of said projection lenses at said predetermined projecting position, and a rotary focusing adjusting means normally urged away from said projection lenses by a spring means to be kept out of contact with said projection lenses and having an engaging portion at the peripheral edge thereof engageable with corresponding engaging portions provided in lens mounts of said projection lenses, said focusing adjusting means being arranged to engage, at said engaging portion thereof, said engaging portion in the lens mounts of said projection lenses upon depression of said focusing adjusting member toward said projection lenses for adjusting focusing of only the selected one of said projection lenses which has been brought to said predetermined projecting position through the pivotal rotation of said change-over means.

2. A variable magnification device as claimed in claim 1, wherein said positioning means for said change-over means includes recesses corresponding in number and position to said projection lenses and provided in one side edge of said change-over means to engage a roller member urged to contact said one side edge by spring means.

3. A variable magnification device as claimed in claim 1, wherein said positioning means for said change-over means includes click recesses corresponding in number and position to said projection lenses and provided in said change-over means to engage a click ball which is provided in a click plate spring secured to a pivotal axis of said change-over means and which is urged toward said click recesses by said click plate spring.

4. A variable magnification device capable of varying magnification of projected images of information media which comprises;

a plurality of interchangeable projection lenses having different focal lengths, a change-over means having said projection lenses mounted thereon for selectively bringing said projection lenses into a predetermined projecting position through pivotal rotation thereof, said change-over means being provided with means for guiding the pivotal rotation thereof and means for positioning a selected one of said projection lenses at said predetermined position, rotary intermediate means of material having a large coefficient of friction and including toothed portions normally engaging corresponding toothed portions formed in the peripheral portion of lens mounts of said projection lenses, and rotary plate portions integral with said toothed portions of said intermediate means, and a rotary focusing adjusting means urged away from said intermediate means by spring means to be normally kept out of contact with said intermediate means and having an engaging portion at the peripheral edge thereof engageable with corresponding engaging portions provided in the peripheral edge of said rotary plate portions of said intermediate means, said focusing adjusting means being arranged to engage, at said engaging portion thereof, said engaging portions of said rotary plate portions of said intermediate means upon depression of said focusing adjusting means toward said intermediate means for adjusting focusing of only the selected one of said projection lenses which has been brought to said predetermined projecting position by the pivotal rotation of said change-over means.

5. A variable magnification device as claimed in claim 4, wherein said engaging portions of said rotary plate portions of said intermediate means are of material having a large coefficient of friction, with friction rings of materials having a large coefficient of friction being provided on said engaging portion of said focusing adjusting means to transmit rotation of said focusing adjusting means to said intermediate means through frictional force therebetween for focusing adjustment of said projection lenses.

6. A variable magnification device as claimed in claim 4, wherein said engaging portions of said rotary plate portions of said intermediate means are provided with teeth, with said engaging portion of said focusing adjusting means also being provided with corresponding teeth to transmit rotation of said focusing adjusting means to said intermediate means for focusing adjustment of said projection lenses.

7. A variable magnification device capable of varying magnification of projected images of information bearing media which comprises;
 a plurality of interchangeable projection lenses having different focal lengths,
 a change-over means having said projection lenses mounted thereon for selectively bringing said projection lenses into a predetermined projecting position through lateral movement thereof, said change-over means being provided with means for guiding the lateral movement thereof and means for positioning a selected one of said projection lenses at said predetermined position, and
 a rotary focusing adjusting means normally urged away from said projection lenses by spring means to be kept out of contact with said projection lenses and having an engaging portion at the peripheral edge thereof engageable with corresponding engaging portions provided in lens mounts of said projection lenses, said focusing adjusting means being arranged to engage, at said engaging portion thereof, said engaging portion in the lens mounts of said projection lenses upon depression of said focusing adjusting means toward said projection lenses for adjusting focusing of only the selected one of said projection lenses which has been brought to said predetermined projecting position through the lateral movement of said change-over means.

8. A variable magnification device as claimed in claim 7, wherein said positioning means for said change-over means includes recesses corresponding in number and position to said projection lenses and provided in the other edge of said change-over means parallel the direction of the lateral movement thereof and engaged by a roller member urged to contact said the other side edge by spring means.

9. A variable magnification device capable of varying magnification of projected images of information bearing media, comprising: a plurality of projection lenses having different focal lengths; support means mounted on said device and supporting said projection lenses at spaced intervals thereon and movable to bring a desired one of said projection lenses into a predetermined projecting position; and focusing adjusting means mounted on said device and normally out of contact with said projection lenses and movable for engagement with only the selected one of said projection lenses which has been brought to said predetermined projecting position for adjusting the focus of said selected one of said lenses.

10. A variable magnification device as claimed in claim 9, further including an intermediate transmission member rotatably disposed to engage said projection lenses and arranged to be engageable with said focusing adjusting means when said selected one of said projection lenses is positioned at said predetermined projecting position.

11. A variable magnification device as claimed in claim 10, wherein said focusing adjusting means is a rotary member having a peripheral portion with a large coefficient of frictional resistance, said projection lenses having a toothed portion on the peripheral portions of the lens mounts thereof and said intermediate transmission member having a toothed portion engaging said toothed portion of the lens mounts of said projection lenses and a rotary plate portion which frictionally contacts said peripheral portion of said rotary member at said focusing adjusting means, said selected one of said projection lenses being rotated upon contact of said peripheral portion of said rotary member of said focusing adjusting means and said rotary plate portion of said intermediate transmission member for enabling the focusing adjustment of said selected one of said projection lenses.

12. A variable magnification device as claimed in claim 9, wherein said focusing adjusting means includes a rotatable rotary member, a support member rotatably and slidably supporting said rotary member, and a resilient member connected to said rotary member for normally maintaining said rotary member at one extreme of the extent of slidable movement on said support member at which said rotary member is out of contact with said projection lenses.

13. A variable magnification device as claimed in claim 12, wherein said resilient member is a spring member.

14. A variable magnification device capable of varying magnification of projected images of information bearing media, comprising: a frame; a plurality of projection lenses having different focal lengths; support means attached to said frame and supporting a desired one of said projection lenses at a predetermined projecting position within said device; and focusing adjusting means attached to said frame and normally out of contact with the selected one of said projection lenses and movable for engagement with said selected projection lens when the focus of said selected projection lens is to be adjusted.

15. A variable magnification device as claimed in claim 14, wherein each of said projection lenses has thereon a first rotary member movable in the direction of the optical axis of said projection lens by rotation thereof for focusing the lens, and said focusing adjusting means includes a second rotary member engageable with said first rotary member of said selected projection lens positioned at said predetermined projecting position; a support member on which said second rotary member is rotatably and slidably supported; and a resilient member connected to said second rotary member for normally maintaining said second rotary member at one extreme of the extent of slidable movement on said support member at which said second rotary member is out of contact with said first rotary member of said selected projection lens.

16. A variable magnification device capable of varying magnification of projected images of information bearing media, comprising; a frame; a plurality of projection lenses having different focal lengths, each of said projection lenses including a movable mounting member for adjusting the focus of said projection lens; support means mounted on said frame and supporting said projection lenses and movable to bring a desired one of said projection lenses into a predetermined projection position; and focusing adjusting means mounted on said frame and including an engaging member normally out of contact with said mounting member and movable for engagement with said mounting member of the selected one of said projection lens for moving said mounting member for focusing the selected one of said projection lenses.

17. A variable magnification device as claimed in claim 16, wherein each of said mounting members is a circular member which is rotatable about the optical axis of said projection lens, and said engaging member is a circular member which is rotatably engageable with the periphery of said mounting member of said selected projection lens.

18. A variable magnification device as claimed in claim 17, in which said focusing adjusting means further comprises a support member for rotatably and slidably supporting said engaging member, and a resilient member connected to said engaging member for normally maintaining said engaging member at one extreme of the extent of slidable movement on said support member at which said engaging member is out of contact with said mounting member of said selected projection lens.

* * * * *